United States Patent
Kang

(10) Patent No.: US 10,359,638 B2
(45) Date of Patent: Jul. 23, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventor: Jin-sung Kang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 205 days.

(21) Appl. No.: 14/845,024

(22) Filed: Sep. 3, 2015

(65) Prior Publication Data

US 2016/0077348 A1   Mar. 17, 2016

(30) Foreign Application Priority Data

Sep. 11, 2014   (KR) .................. 10-2014-0120429

(51) Int. Cl.
*G02B 27/22* (2018.01)
*H04N 13/31* (2018.01)
*H04N 13/315* (2018.01)

(52) U.S. Cl.
CPC ......... *G02B 27/2214* (2013.01); *H04N 13/31* (2018.05); *H04N 13/315* (2018.05)

(58) Field of Classification Search
CPC .............. G02B 27/2214; G02B 27/22; G02B 27/2264; G02B 27/017; G02B 27/26; G02B 27/2228; G02B 27/2257; G02B 27/2235; G02B 27/225; H04N 13/409; H04N 13/413; H04N 13/468; H04N 13/0404–0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 9/3197; H04N 9/3105; G06T 15/00; G03B 35/00–12; G03B 35/20; G03B 31/06; G03B 31/00
USPC ...... 359/462–464, 466; 348/42–60; 353/7–9; 349/8–9, 15
See application file for complete search history.

(56) References Cited

U.S. PATENT DOCUMENTS

| 2012/0120065 A1 | 5/2012 | Kim et al. | |
| 2013/0113786 A1* | 5/2013 | King .................. | H04N 13/0472 345/419 |
| 2014/0078268 A1* | 3/2014 | Watanabe .......... | G02B 27/2214 348/54 |

FOREIGN PATENT DOCUMENTS

WO   2013/054243   4/2013

OTHER PUBLICATIONS

Extended Search Report dated Feb. 4, 2016 in counterpart European Application No. 15182809.2.

* cited by examiner

*Primary Examiner* — Stephone B Allen
*Assistant Examiner* — Jyotsna V Dabbi
(74) *Attorney, Agent, or Firm* — Nixon & Vanderhye P.C.

(57) ABSTRACT

A display apparatus and a control method. The display apparatus includes: a display panel including a left-eye pixel and a right-eye pixel, the display panel being bendable with a curvature when bent falling within a predetermined range; a visual field divider including a barrier area for blocking part of light output by the display panel; and a controller configured to control the visual field divider to adjust a distance between the display panel and the barrier area based on the curvature of the display panel.

10 Claims, 10 Drawing Sheets

DISPLAY APPARATUS AND CONTROL METHOD THEREOF

CROSS-REFERENCE TO RELATED APPLICATION

This application is based on and claims priority under 35 U.S.C. § 119 to a Korean patent application filed on Sep. 11, 2014 in the Korean Intellectual Property Office and assigned Serial No. 10-2014-0120429, the disclosure of which is incorporated by reference herein in its entirety.

TECHNICAL FIELD

Apparatuses and methods consistent with example embodiments relate to a display apparatus and a control method thereof, and for example, to a display apparatus for non-glasses 3D viewing, which can maintain the effect of a 3-dimensional (3D) image even when a curvature, which indicates the degree of bending of a display panel, is changed, and a control method thereof.

BACKGROUND

With the enhancement of electronic technologies, various kinds of electronic devices have been developed and distributed, and users are easily in touch with not only a large display apparatus such as a television (TV), but also a small display apparatus such as a smart phone, a tablet PC, etc. in their daily lives.

In addition, 3D display apparatuses which allow users to view 3D image screens are being distributed in recent years. The 3D display apparatus is divided into a type of system that requires special 3D classes, and a system that does not require glasses (e.g., a non-glasses type system).

As an example of the glasses-type system, a display apparatus of a shutter glasses method is used. The shutter glasses method refers to a method which outputs a left-eye image and a right-eye image alternately and opens and closes the left and right shutter glasses of 3D glasses that a user wears alternately in response to the alternating output of the left and right-eye images, so that the user can feel a sense of depth.

The non-glasses type system is referred to as an autostereoscopy system. A 3D display apparatus using the non-glasses method projects light corresponding to images of different points of view onto the left and right eyes of a viewer using a parallax barrier method, which displays a multi-view image shifted in space, or a lenticular lens, thereby making the user feel a sense of depth.

In particular, the display apparatus using the non-glasses system in the parallax barrier method includes a barrier to generate a binocular difference based on the locations of left-eye and right-eye pixels included in the display panel. Accordingly, in the display panel in a flat state, the barrier is located in front of the pixels so as to maintain a predetermined gap between the pixel and the barrier, so that the user can experience a 3D image without extra glasses.

However, in the case of a display apparatus having a curved display panel, if the barrier located in the existing parallax barrier method is used, the locations of the left-eye and right-eye pixels and the gap between the pixel and the barrier are changed by the related-art parallax barrier method, and thus the 3D effect can be reduced.

Therefore, there is a need for a method for controlling a location of a barrier to realize the 3D effect even when a curvature of a display panel is changed.

SUMMARY

One or more example embodiments may overcome the above disadvantages and other disadvantages not described above.

One or more example embodiments provide a display apparatus of a non-glasses method, which can maintain the effect of a 3D image even when a curvature of a display panel is changed, and a control method thereof.

According to an aspect of an example embodiment, a display apparatus is provided including: a display panel which includes a left-eye pixel and a right-eye pixel, and is bent with a curvature falling within a predetermined range; a visual field divider which includes a barrier area for blocking part of light outputted through the display panel; and a controller configured to control the visual field divider to adjust a distance between the display panel and the barrier area based on the curvature of the display panel.

The visual field divider may, for example, include a plurality of blocking layers, and the controller may be configured to adjust the distance between the display panel and the barrier area by activating some areas of the plurality of blocking layers to block a part of the light output from the display panel based on locations of the left-eye pixel and the right-eye pixel and based on the curvature of the display panel.

The controller may be configured to control the distance between the display panel and the barrier area to be reduced by activating a blocking layer located in the proximity of the display panel from among the plurality of blocking layers, as a distance from the center of the display panel increases.

As the curvature increases, the controller may be configured to control a distance between left and right outermost ends of the display panel and the barrier area to be reduced.

In response to the curvature of the display panel being 0 (i.e., flat), the controller may be configured to control the visual field divider to maintain the distance between the display panel and the barrier area uniformly, and, in response to the curvature being greater than 0, the controller may be configured to control the visual field divider to adjust the distance between the display panel and the barrier area based on locations of the left-eye pixel and the right-eye pixel based on the curvature of the display.

The display apparatus may further include a storage configured to store a barrier pattern indicating an activation state of the barrier area based on the curvature, and, in response to the curvature of the display panel being changed, the controller may be configured to control activation of the barrier area based on the stored barrier pattern.

According to an aspect of an example embodiment, a method of controlling a display apparatus is provided, including: determining a curvature indicating a degree of bending of a display panel which includes a left-eye pixel and a right-eye pixel; and adjusting a distance between the display panel and a barrier area based on the determined curvature.

Adjusting may include adjusting the distance between the display panel and the barrier area by activating some areas of a plurality of blocking layers included in a visual field divider to block a part of light output from the display panel based on locations of the left-eye pixel and the right-eye pixel based on the curvature of the bent display panel.

Adjusting may include controlling the distance between the display panel and the barrier area to be reduced by activating a blocking layer located in the proximity of the display panel from among the plurality of blocking layers, as a distance from the center of the display panel increases.

Adjusting may include, as the curvature increases, controlling a distance between left and right outermost ends of the display panel and the barrier area to be reduced.

Adjusting may include, in response to the curvature of the display panel being 0, adjusting the distance between the display panel and the barrier area to be maintained uniformly, and, in response to the curvature being greater than 0, controlling the distance between the display panel and the barrier area based on locations of the left-eye pixel and the right-eye pixel based on the curvature.

The method may further include storing a barrier pattern indicating an activation state of the barrier area based on the curvature, and adjusting may include, in response to the curvature of the display panel being changed, controlling activation of the barrier area based on the stored barrier pattern.

According to various example embodiments described above, a display apparatus using a non-glasses method, can maintain the effect of a 3D image even when a curvature of a display panel is changed.

BRIEF DESCRIPTION OF THE DRAWINGS

The above and other aspects, features, and advantages of example embodiments will become more apparent from the following detailed description taken in conjunction with the accompanying drawings, in which like reference numerals refer to like elements, and wherein.

DETAILED DESCRIPTION

Example embodiments will be described in greater detail with reference to the accompanying drawings. In the following description, well-known functions or constructions are not described in detail since they might obscure the disclosure with unnecessary detail. Also, the terms used herein are defined according to the functions of the example embodiments. Thus, the terms may vary depending on user's or operator's intention and usage. That is, the terms used herein must be understood based on the descriptions made herein.

Figure 1:
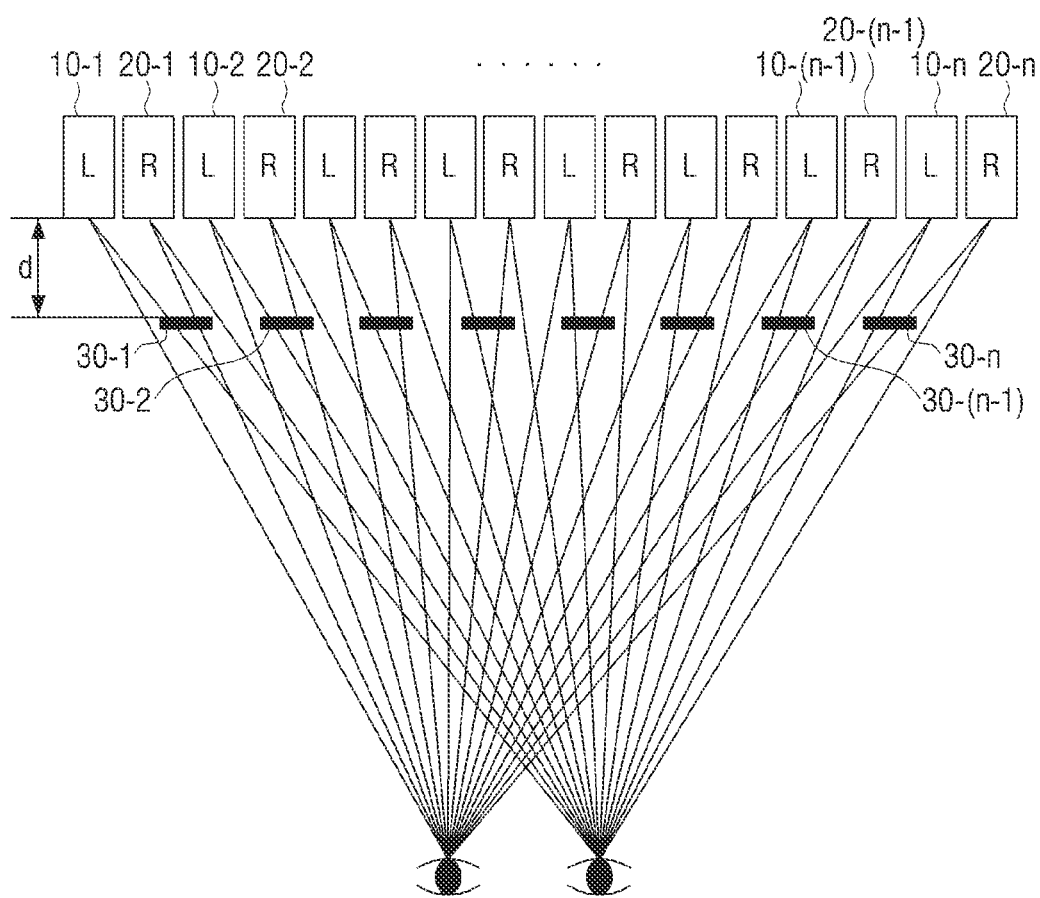
FIG. 1 is a view illustrating a method for providing a 3D image of a display apparatus, which displays a multi-view image and provides a 3D image in a non-glasses method.

FIG. 1 illustrates an operating method of an apparatus which provides a 3D image in a non-glasses system by displaying a multi-view image. The multi-view image includes a plurality of images which are obtained by photographing the same object at different angles. For example, a plurality of images photographed at different points of view are refracted by different angles, and a focused image is provided to a location at a predetermined distance, which is a so-called viewing distance (about 3 m). The location where such an image is formed is referred to as a viewing area (or an optical view). When one eye of the user is located at a first viewing area and the other eye is located at a second viewing area, the user can feel a sense of depth.

For example, when a display panel is implemented in a flat shape without being bent or curved as, for example, in a display apparatus 10 as shown in FIG. 1, the display apparatus 10 may include a plurality of left-eye pixels 10-1, 10-2, ..., 10-(n−1), 10-n and a plurality of right-eye pixels (20-1, 20-2, ..., 20-(n−1), and 20-n) to display a left-eye image and a right-eye image, respectively, and may include a visual field divider which is disposed in front of the plurality of pixels to provide a different point of view for each viewing area, that is, a multi-view.

When the visual field divider is implemented in the parallax barrier method, the visual field divider may be implemented by using a transparent slit array including a plurality of barrier areas 30-1, 30-2, ..., 30-(n−1), 30-n. Light is blocked by the barrier areas and passes through slits between the barrier areas 30-1, 30-2, ..., 30-(n−1), 30-n so that an image of a different point of view can be emitted for each viewing area.

Since the display panel is implemented in the flat shape, a distance d between each of the plurality of left-eye pixels 10-1, 10-2, ..., 10-(n−1), 10-n) and the plurality of right-eye pixels 20-1, 20-2, ..., 20-(n−1), 20-n, and the visual field divider disposed in front of the plurality of pixels is uniform. Therefore, the user may view a left-eye image displayed by the left-eye pixels 10-1, 10-2, ..., 10-(n−1), 10-n with the user's left eye, and may view a right-eye image displayed by the right-eye pixels 20-1, 20-2, ..., 20-(n−1), 20-n with the user's right eye. In other words, the user may view an image of a different point of view for each viewing area.

The visual field divider which is implemented by using the parallax barrier method is merely an example and may be implemented for example using a lenticular lens.

When the visual field divider is implemented by using the lenticular lens (not shown) including a plurality of lens areas, the lenticular lens may refract the image displayed on the display panel through the plurality of lens areas. Each of the lens areas may be formed to have a size corresponding to at least one pixel and thus disperse the light passing through each pixel differently based on each viewing area.

Figure 2:
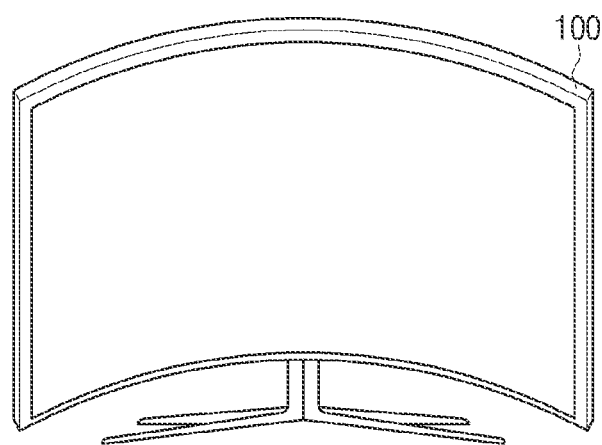
FIG. 2 is a view illustrating a bendable display apparatus according to an example embodiment.

FIG. 2 is a view illustrating a display apparatus 100 including a display panel which is bent with a curvature falling within a predetermined range according to an example embodiment. The display apparatus 100 may be implemented by using various kinds of electronic devices such as a TV, an electronic board, an electronic table, a Large Format Display (LFD), a smart phone, a tablet, a desktop PC, a laptop, etc.

The display panel has a predetermined curvature or radius of curvature formed, for example, by bending the left/right of the display panel in a flat state. The curvature or radius of curvature is a value representing the degree of curvature at each point of a curved surface. The curvature is a reciprocal number of the radius of curvature. That is, as the radius of curvature increases, the curvature of the curved surface becomes gentle, and as the radius of curvature decreases, the curvature of the curved surface becomes tight. To the contrary, as the curvature increases, the curve of the curved surface becomes tight, and as the curvature decreases, the curve of the curved surface becomes gentle. In other words, when the curvature is 0, a flat surface is obtained.

In this description, the curvature or radius of curvature is defined as a value representing the degree of curvature at each point of a curved surface.

Figure 3:
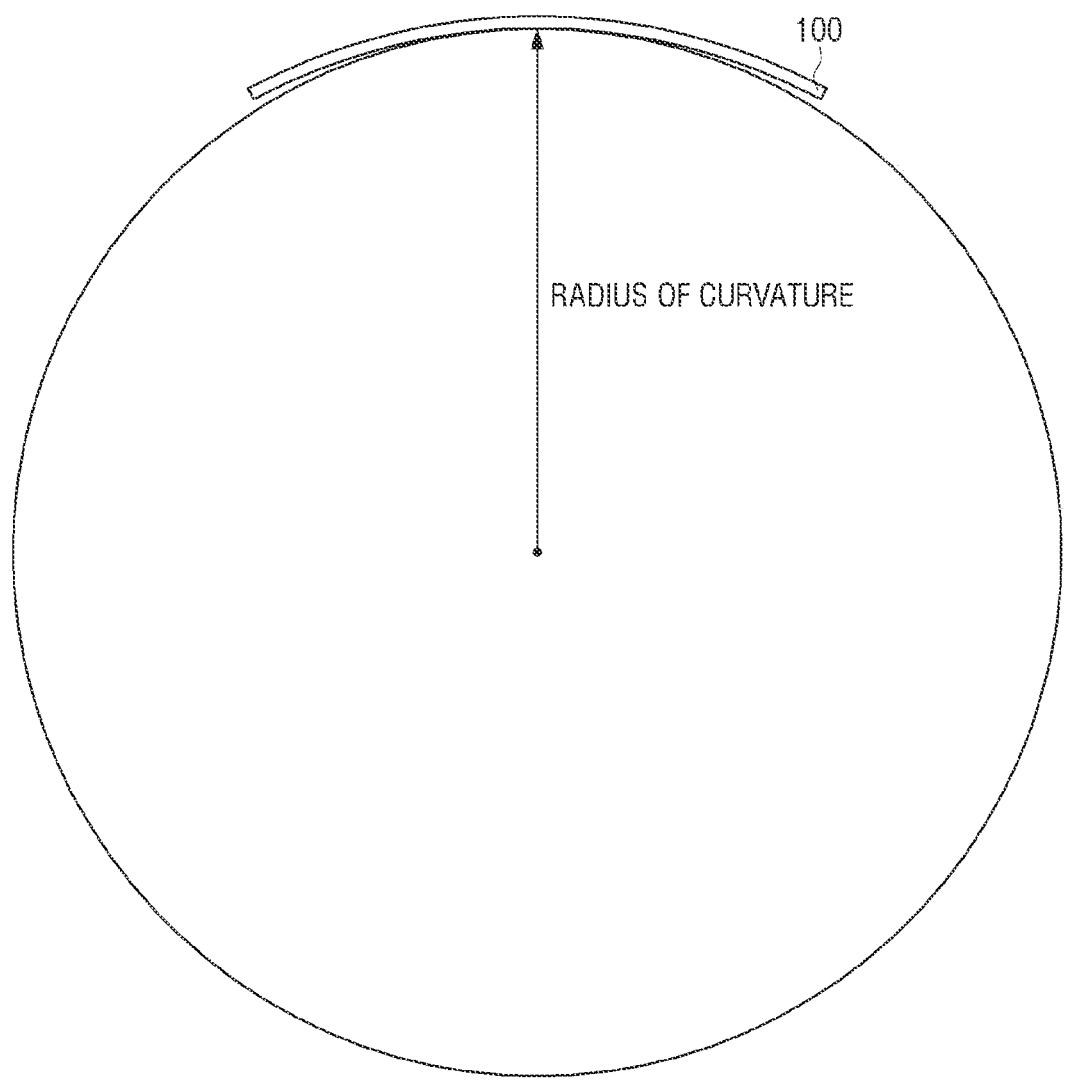
FIG. 3 is a view illustrating a radius of a curvature of a bent display panel of a display apparatus.

For example, when a part of the bent display panel is expressed by an arc of a circle having a certain radius as shown in FIG. 3, the radius of the corresponding circle is a radius of curvature. Therefore, a large radius of curvature indicates that the part of the bent display panel is in contact with a circle having a relatively large radius. Therefore, when the display panel has a large radius of curvature, the display panel is gently curved and thus has a gentle curve on a curved surface.

The display apparatus may change the curvature or radius of curvature in order to reduce a distortion of a viewing angle while a user is viewing a 3D image. For example, the display apparatus may determine an appropriate curvature or radius of curvature based on the viewing distance, location, or etc. of the user, determine the degree of bending of the display panel, and control the display panel.

Figure 4:
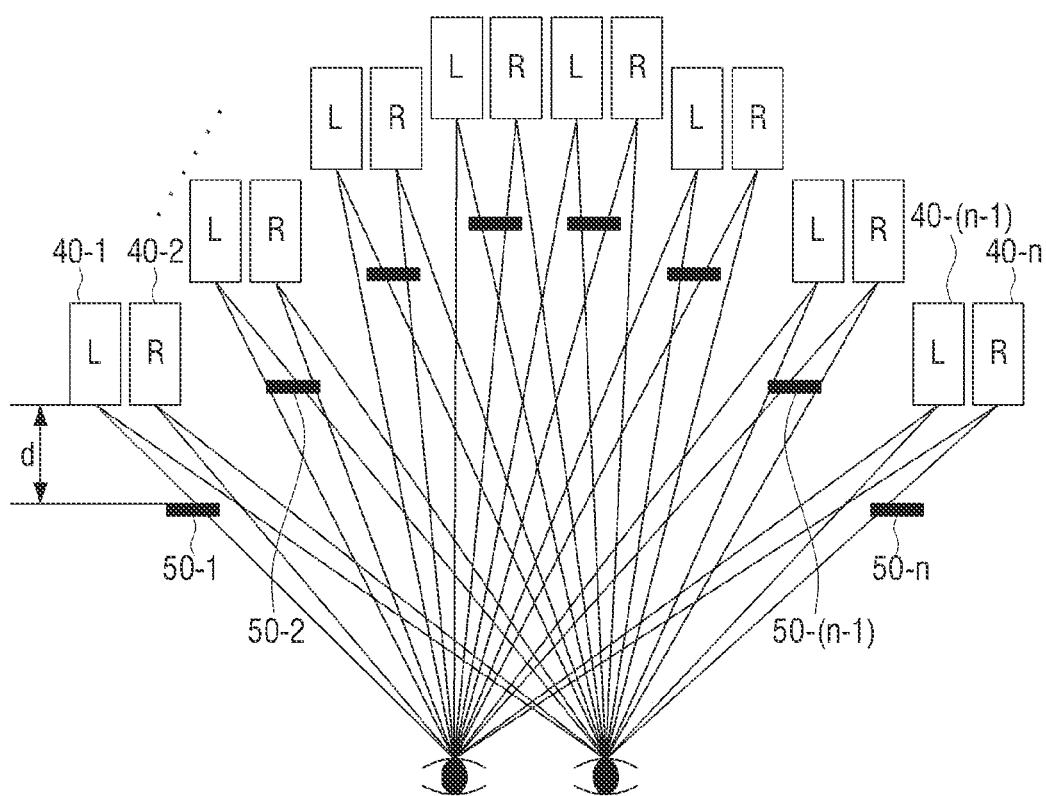
FIG. 4 is a illustrating a problem which arises when a related-art parallax barrier method is used in a bendable display apparatus.

FIG. 4 is a view schematically illustrating a plurality of pixels 40-1, 40-2, . . . , 40-(n−1), 40-n and barrier areas 50-1, 50-2, . . . , 50-(n−1), 50-n of a visual field divider of a bendable display apparatus as shown in FIG. 2.

In particular, in the bendable display apparatus shown in FIG. 4, a distance d between each of the plurality of pixels 40-1, 40-2, . . . , 40-(n−1), 40-n and each of the barrier areas 50-1, 50-2, . . . , 50-(n−1), 50-n included in the visual field divider is uniformly maintained like in the display apparatus the display panel of which is not bent. In this case, there may be an area where the barrier areas 50-1, 50-2, . . . , 50-(n−1), 50-n have difficulty in performing their functions of allowing an image displayed by the left-eye pixel to enter the user's left eye and allowing an image displayed by the right-eye pixel to enter the user's right eye.

For example, as the display panel is bent with a curvature falling within a predetermined range, the first barrier area 50-1 of FIG. 4 blocks the left-eye image displayed by the left-eye pixel 40-1 from entering the user's left eye and allows the left-eye image to enter the user's right eye, and allows the right-eye image displayed by the right-eye pixel 40-2 to enter both the left and right eyes of the user. Therefore, the user may not view images of different points of view divided through the left and right eyes and thus has difficulty in feeling a sense of depth.

The n-th barrier area 50-n of FIG. 4 performs the same operation. As the display panel is bent with the curvature falling within the predetermined range, the n-th barrier area 50-n allows the left-eye image displayed by the left-eye pixel 40-(n−1) to enter both the left and right eyes of the user. In addition, the n-th barrier area 50-n blocks the right-eye image displayed by the right-eye pixel 40-n from entering the user's right eye and instead allows the right-eye image to enter the user's left eye. Therefore, the user may not view images of different points of view divided through the left and right eyes and thus has difficulty in feeling a sense of depth.

As a result, when the panel of the bendable display apparatus is bent, but the distance between each of the plurality of pixels 40-1, 40-2, . . . , 40-(n−1), 40-n and each of the barrier areas 50-1, 50-2, . . . , 50-(n−1), 50-n included in the visual field divider is uniformly maintained, the barrier areas 50-1, 50-2, . . . , 50-(n−1), 50-n may not divide the left-eye and right-eye images properly and thus there may be an area where the user is hindered from viewing images of different points of view through the left and right eyes. This problem becomes more serious in the areas at the far left and right sides of the display apparatus as shown in FIG. 4, and thus the effect of a 3D image is greatly reduced in those areas.

Figure 5:
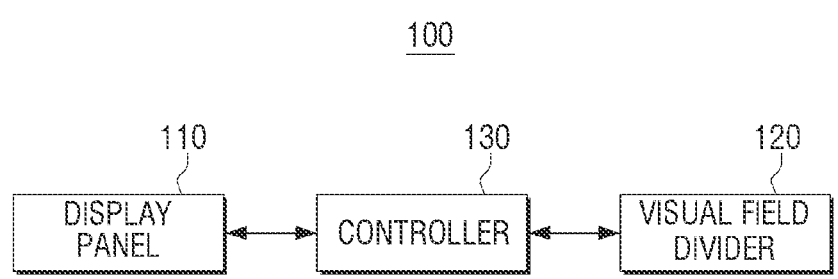
FIG. 5 is a block diagram illustrating a configuration of a display apparatus according to an example embodiment.

FIG. 5 is a block diagram schematically illustrating a configuration of a display apparatus 100 configured to overcome the above-described problem according to an example embodiment.

Referring to FIG. 5, the display apparatus 100 includes a display panel 110, a visual field divider 120, and a controller 130. The display apparatus 100 may be implemented using various kinds of display apparatuses such as a TV, a monitor, a PC, a kiosk, a tablet PC, an electronic album, a kiosk, a mobile phone, etc.

The display panel 110 includes a plurality of pixels each including a plurality of sub-pixels. The sub-pixels may include red (R), green (G), and blue (B). That is, the pixels formed of the sub pixels of R, G, and B are arranged in the directions of the plurality of rows and columns, thereby forming the display panel 110. In this case, the display panel 110 may be implemented by using various display units such as a Liquid Crystal Display (LCD) panel, a Plasma Display Panel (PDP), an Organic Light Emitting Diode (OLED), a Vacuum Fluorescent Display (VFD), a Field Emission Display (FED), an Electro Luminescence Display (ELD), etc.

In addition, the display panel 110 may include left-eye pixels and right-eye pixels. That is, the display panel 110 may include the left-eye pixels for displaying a left-eye image, and the right-eye pixels for displaying a right-eye image.

The display panel 110 may display an image frame. Specifically, the display panel 110 may display an image frame in which a plurality of images of different points of view are arranged serially and repeatedly.

In addition, the display panel 110 may be bent or curved to have a curvature falling within a predetermined range. That is, the display panel 110 may be implemented to be deformable to provide the curvature. For example, the display panel 110 may have a predetermined curvature or radius of curvature by bending the left/right of the display panel in the flat state. The curvature or radius of curvature is a value representing the degree of curve at each point of a curved surface. The curvature is a reciprocal number of the radius of curvature. That is, as the radius of curvature increases, the curve of the curved surface becomes gentle, and as the radius of curvature decreases, the curve of the curved surface becomes tight. In other words, as the curvature increases, the curve of the curved surface becomes tight, and as the curvature decreases, the curve of the curved surface becomes gentle. That is, when the curvature is 0, a flat surface is obtained.

The visual field divider 120 is disposed in front of the display panel 110 and provides a different point of view for each viewing area, that is, a multi-view. The visual field divider 120 may be included in a display liquid crystal.

In addition, the visual field divider 120 may be implemented by using a lenticular lens or a parallax barrier. The following description is provided on the assumption that the visual field divider 120 is implemented by using the parallax barrier for convenience.

The visual field divider 120 may include a barrier area for blocking a part of light output through the display panel 110. That is, the parallax barrier may be implemented by using a transparent slit array including a plurality of barrier areas.

The light is passed through slits between the barrier areas so that an image of a different point of view can be emitted for each viewing area.

The controller 130 is an element configured to control the overall operation of the display apparatus 100. In particular, the controller 130 may control the visual field divider 120 to adjust a distance between the display panel 110 and the barrier areas based on the curvature of the display panel 110. A method for controlling the distance between the display panel 110 and the barrier area will be explained in detail below.

Figure 6:
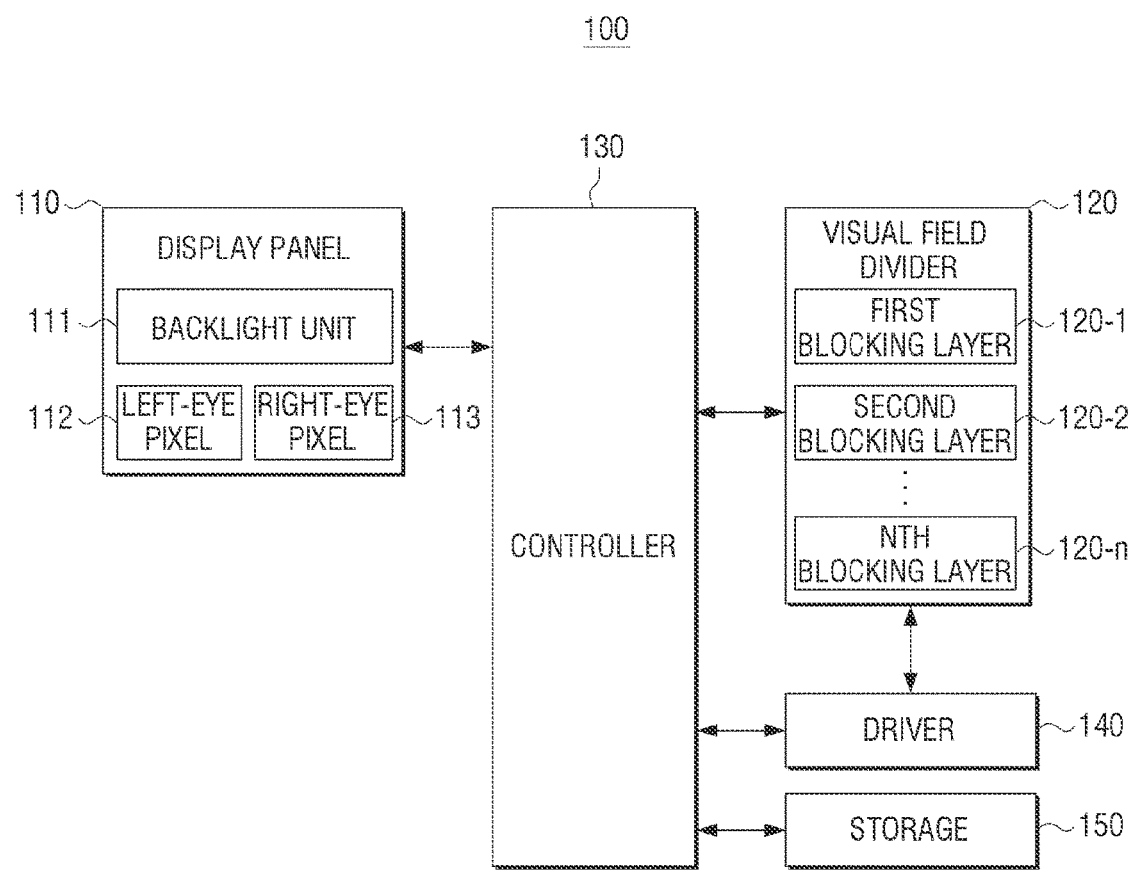
FIG. 6 is a block diagram illustrating a configuration of a display apparatus according to an example embodiment.

The configuration of the display apparatus 100 will be explained with reference to FIG. 6. FIG. 6 is a block diagram showing the configuration of the display apparatus 100 according to an example embodiment. As shown in FIG. 6, the display panel 110 of the display apparatus 100 may include a backlight unit 111, a left-eye pixel 112, and a right-eye pixel 113. In addition, the visual field divider 120 of the display apparatus 100 may include a plurality of blocking layers 120-1 to 120-n. In addition, the display apparatus 100 may further include the controller 130, a driver 140, and a storage 150. According to an example embodiment, some of the elements shown in FIG. 6 may be omitted or changed and other elements may be added.

The display panel 110 may include the backlight unit 111, the left-eye pixel 112, and the right-eye pixel 113.

The backlight unit 111 is disposed behind the plurality of pixels including the left-eye pixel 112 and the right-eye pixel 113 to provide light to the plurality of pixels. The left-eye pixel 112 and the right-eye pixel 113 may display the left-eye and right-eye images, respectively.

That is, the images displayed by the left-eye pixel 112 and the right-eye pixel 113 are projected onto the visual field divider 120 by the light provided by the backlight unit 111, and the visual field divider 120 disperses the light of each of the projected images and transmits the light toward a viewer.

The backlight unit 111 may, for example, be configured as a light source such as a CCFL and an LED, and various optical films (a diffuser, a prism, DBEF, etc.).

The visual field divider 120 is disposed in front of the display panel 110 and provides a different point of view for each viewing area, that is, a multi-view. The visual field divider 120 may be included in a display liquid crystal.

The visual field divider 120 may be implemented by using a lenticular lens or a parallax barrier. The following description is provided on the assumption that the visual field divider 120 is implemented by using the parallax barrier for convenience.

The visual field divider 120 may include a barrier area for blocking a part of the light outputted through the display panel 110. That is, the parallax barrier may be implemented by using a transparent slit array including a plurality of barrier areas. Accordingly, the light is passed through slits between the barrier areas so that an image of a different point of view can be emitted for each viewing area.

In addition, the visual field divider 120 may include the plurality of blocking layers 120-1 to 120-n. That is, the visual field divider 120 has the plurality of blocking layers including the plurality of barrier areas overlapping one another. The plurality of blocking layers 120-1 to 120-n may be included in the display liquid crystal.

The driver 140 may drive at least one curvature varying unit (not shown) provided on the display panel 110 to correspond to a determined curvature in order for the user to secure an appropriate viewing angle, under the control of the controller 130.

The driver 140 may further include a panel driver (not shown) to drive the pixels of the display panel 110.

In addition, the driver 140 may include a driving circuit (not shown) to control activation of the barrier areas included in each blocking layer 120-1 to 120-n. The driving circuit (not shown) may control the activation/inactivation of the barrier areas under the control of the controller 130. The activated barrier area may block the light.

The storage 150 may store a barrier pattern indicating the activation state of the barrier areas based on the curvature. That is, a barrier area to be activated may be determined from among the plurality of barrier areas included in the plurality of blocking layers 120-1 to 120-n differently based on the curvature of the display panel 110.

The storage 150 may store the barrier pattern indicating the activation state of the barrier areas based on each curvature in advance. In response to the curvature of the display panel 110 being determined under the control of the controller 130, the activation of the plurality of barrier areas included in the plurality of blocking layers 120-1 to 120-n may be controlled using the pre-stored barrier pattern corresponding to the determined curvature.

The controller 130 may be configured to selectively activate a blocking layer for blocking a part of the light output from the display panel 110 from among the plurality of blocking layers based on the locations of the left-eye pixel and the right-eye pixel based on the curvature of the display panel 110.

For example, the controller 130 may be configured to control a blocking layer located in the proximity of the display panel 110 to be activated from among the plurality of blocking layers 120-1 to 120-n as the distance from the center of the display panel 110 increases. The controller 130 controls the display to reduce the distance between the display panel 110 and the barrier areas as the distance from the center of the display panel 110 increases.

In addition, the controller 130 may be configured to control the distance between the display panel 110 and the barrier areas based on the curvature of the display panel 110. As the curvature increases and thus the display panel 110 is further bent, the controller 130 may be configured to control the display to reduce the distance between the display panel 110 and the barrier areas on the left and right side portions of the display panel 110.

When the curvature of the display panel 110 is 0, the controller 130 may be configured to control the visual field divider 120 to maintain the distance between the display panel 110 and the barrier areas uniformly. In addition, when the curvature of the display panel 110 is greater than 0, the controller 130 may be configured to control the visual field divider 120 to adjust the distance between the display panel 110 and the barrier areas based on the locations of the left-eye pixel 112 and the right-eye pixel 113 based on the curvature.

A method for adjusting the distance between the display panel 110 and the barrier areas based on the curvature of the display panel 110 will be explained with reference to FIGS. 7 and 8.

Figure 7:
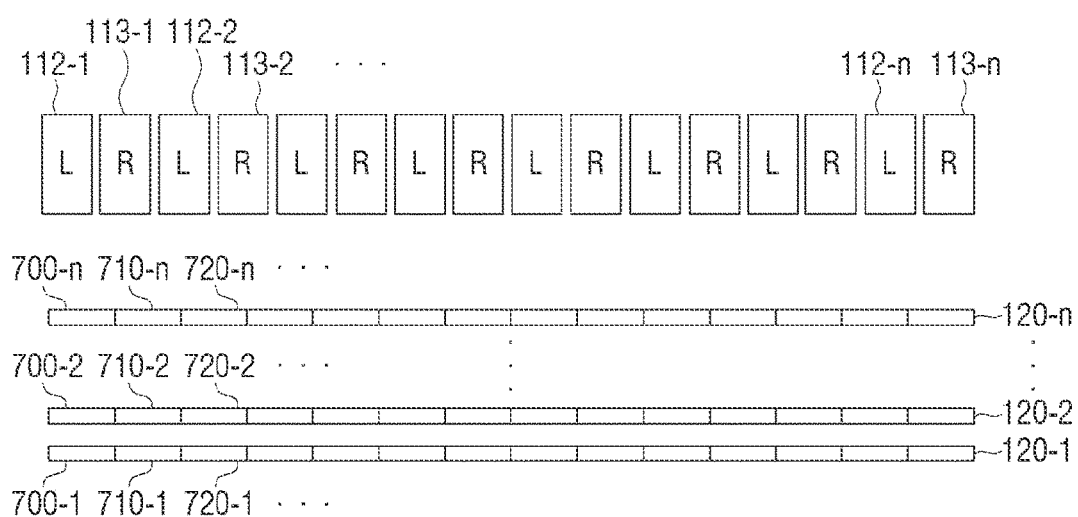
FIG. 7 is a view illustrating a display apparatus including a plurality of blocking layers according to an example embodiment.

FIG. 7 is a view illustrating left-eye pixels 112-1 to 112-n and right-eye pixels 113-1 to 113-n of the display panel 110, and a plurality of blocking layers 120-1 to 120-n according to an example embodiment.

Each of the plurality of blocking layers 120-1 to 120-n may be divided into a plurality of areas. For example, the first blocking layer 120-1 may include a first area 700-1, a second area 710-1, . . . . The size of the plurality of areas dividing each of the layers 120-1 to 120-*n* may depend on the size of the plurality of pixels, the distance between the pixels, etc.

When all of the areas of each of the blocking layers 120-1 to 120-*n* are inactivated, the light passing through the plurality of pixels 112-1 to 112-*n* and 113-1 to 113-*n* penetrates and thus is transmitted to the user.

In addition, when some areas of the blocking layers 120-1 to 120-*n* are activated, the light passing through the plurality of pixels 112-1 to 112-*n* and 113-1 to 113-*n* does not penetrate in the activated areas.

For example, when the curvature of the display panel 110 is 0, only one of the blocking layers 120-1 to 120-*n* may be activated. For example, when only the first blocking layer 120-1 is activated and a 3D image is displayed, the first area 700-1, the third area 720-1, and the fifth area, and the seventh area included in the first blocking layer 120-1 may be activated. That is, the activated areas are the barrier areas and the inactivated areas are the slits, so that part of the light passing through the pixels is blocked.

The width of the plurality of areas included in each blocking layer may be narrower than that of FIG. 7. Therefore, the first to third areas, the seventh to ninth areas, the thirteenth to fifteenth areas included in the first blocking layer 120-1 may be controlled to be activated. As the width of the plurality of areas included in each blocking layer decreases, the controller 130 may be configured to control the barrier areas to have a dense and continuous pattern.

When the display panel 110 is bent with a curvature determined under the control of the controller 130, the controller 130 may be configured to activate some areas of the plurality of blocking layers 120-1 to 120-*n* based on the curvature and the locations of the plurality of pixels.

Specifically, the controller 130 may be configured to control the distance between the display panel 110 and the barrier areas in the center of the display panel 110 to be the same as the distance between the display panel 110 and the barrier areas when the curvature is 0. In addition, the controller 130 may control the distance between the display panel 110 and the barrier area to be gradually smaller as the distance from the center of the display panel 110 increases.

Figure 8:
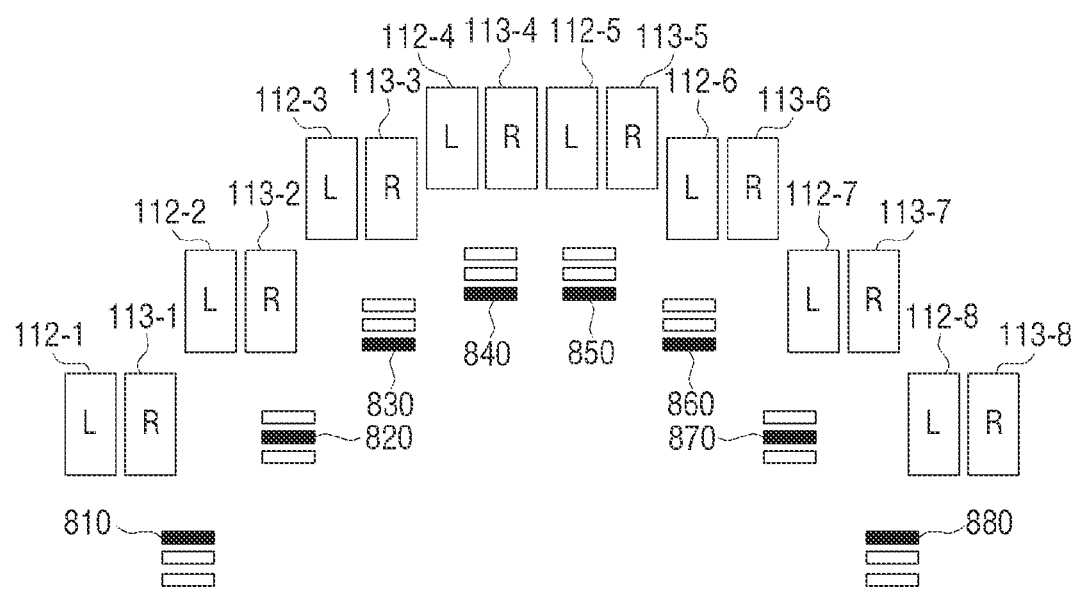
FIGS. 8 and 9 are views illustrating a method for controlling a location of a barrier in a display apparatus according to an example embodiment.

FIG. 8 is a view illustrating a method for changing the distance between the display panel 110 and the barrier areas differently based on the location of the display panel 110. In FIG. 8, the visual field divider 120 includes, for example, three blocking layers and eight left-eye pixels and eight right-eye pixels are provided. However, this is merely an example, and the number of blocking layers included in the visual field divider 120 and the number of pixels may depend on the kind, size, resolution, etc., of the display apparatus 100.

From among the three blocking layers, the blocking layer located at the longest distance from the pixels is referred to as a first blocking layer, the blocking layer located in the middle is referred to as a second blocking layer, and the blocking layer located at the shortest distance from the pixels is referred to as a third blocking layer.

When the curvature of the display panel 110 is 0, the controller 130 forms the barrier areas by activating the first blocking layer located at the longest distance from the pixels.

With respect to the pixels 112-4, 113-4, 112-5, 113-5 located at the center of the display panel 110 and their neighboring pixels 112-3, 113-3, 112-6, and 113-6, the controller 130 may be configured to form the barrier areas 830, 840, 850, and 860 by activating the first blocking layer located at the longest distance from the pixels from among the three blocking layers as in the case where the curvature of the display panel 110 is 0. For example, the controller 130 may be configured control a current to flow in the driving circuit (not shown) connected to the barrier areas 830, 840, 850, and 860 of the blocking layer, and may activate the barrier areas to not allow the light to pass therethrough.

That is, the center of the display panel 110 may be less affected by the curvature than the other parts even when the display panel 110 is bent with a curvature. Therefore, with respect to the center of the display panel 110, the controller 130 may be configured to control the visual field divider to form the barrier areas at the same location as in the case where the curvature of the display panel 110 is 0.

With respect to the pixels 112-2, 113-2, 112-7, and 113-7 located at a predetermined distance from the center of the display panel 110, the controller 130 may be configured to control the distance between the pixels and the barrier areas to be smaller than that at the center of the display panel 110.

For example, with respect to the pixels 112-2, 113-2, 112-7, and 113-7 located at the predetermined distance from the center of the display panel 110, the controller 130 may be configured to form the barrier areas 820, 870 by activating the second blocking layer located in the middle from among the three blocking layers.

The pixels 112-2, 113-2, 112-7, and 113-7 located at the predetermined distance from the center of the display panel 110 are closer to the barrier areas than the pixels 112-4, 113-4, 112-5, and 113-5 located at the center and their neighboring pixels 112-3, 113-3, 112-6, and 113-6.

With respect to the pixels 112-1, 113-1, 112-8, and 113-8 located at the outermost ends at the left and right sides of the display panel 110, the controller 130 may be configured to control the distance between the pixels and the barrier areas to be the smallest.

Specifically, with respect to the pixels 112-1, 113-1, 112-8, and 113-8 located at the outermost ends of the display panel 110, the controller 130 may be configured to form the barrier areas 810, 880 by activating the third blocking layer located at the shortest distance from the pixels from among the three blocking layers. As a result, the distance between the pixels and the barrier areas is reduced as the distance from the center of the display panel 110 increases.

When the curvature of the display panel shown in FIG. 8 is, for example, a, the controller 130 may be configured to store the pattern of the barrier areas when the curvature is a, that is, the barrier pattern of the barrier areas formed in the form indicated by reference numerals 800-3, 820, 830, 840, 850, 860, 870, 880, in the storage 150.

In response to the curvature of the display panel 110 being changed to a, the controller 130 may be configured to easily control the activation/inactivation of the visual field divider 120 using the barrier pattern pre-stored in the storage unit 150.

Figure 9:
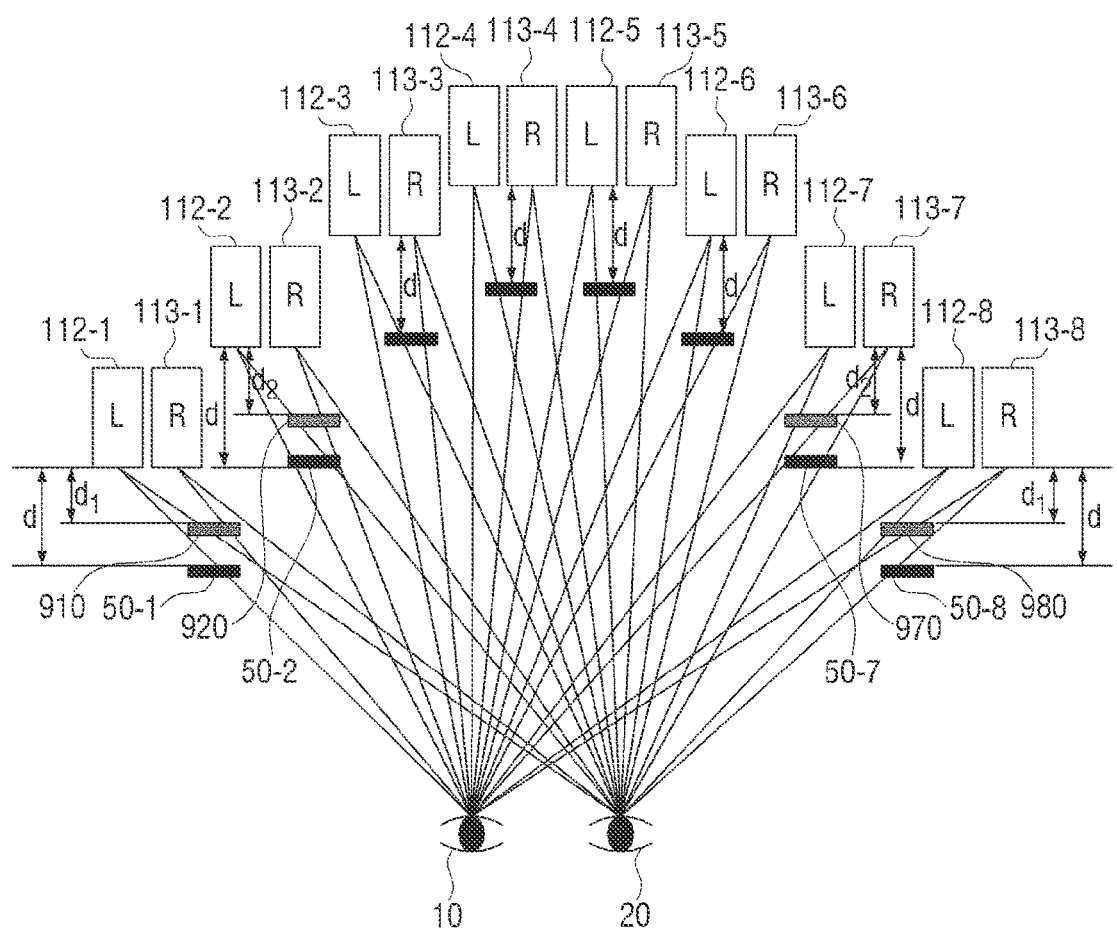

FIG. 9 is a view illustrating a method for emitting an image of a different point of view for each viewing area when the barrier areas are formed as shown in FIG. 8 according to an example embodiment.

In a curved display, when the distance between the pixels and the barrier areas is uniformly maintained as d as in the case where the curvature of the display panel 110 is 0, there may be an area where the effect of the 3D image the user can feel is reduced.

However, with respect to the pixels located at the outermost ends of the display panel 110, the distance between the pixels and the barrier areas is controlled to be d1, which is shorter than d, and, with respect to the pixels located near to the outermost pixels of the display panel 110, the distance between the pixels and the barrier areas is controlled to be d2, which is longer than d1 and shorter than d, so that the effect of the 3D image can be improved.

The related-art barrier area 50-1, which corresponds to the pixels located at the outermost end of the display panel 110, blocks the left-eye image displayed by the left-eye pixel 112-1 from entering the user's left eye and allows the right-eye image displayed by the right-eye pixel 113-1 to enter both the user's left and right eyes. In addition, the barrier area 50-8 allows the left-eye image displayed by the left-eye pixel 112-8 to enter both the user's left and right eyes and blocks the right-eye image displayed by the right-eye pixel 113-8 from entering the user's right eye.

The changed barrier areas 910, 980 allow an image of a different point of view to be emitted for each viewing area, and thus the user can view a 3D image of an enhanced 3D image effect.

Figure 10:
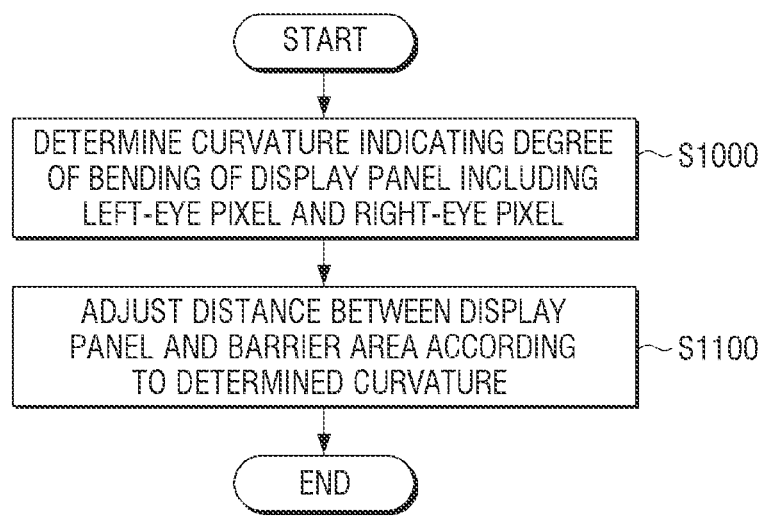
FIG. 10 is a flowchart illustrating a method for controlling a location of a barrier in a display apparatus according to an example embodiment.

FIG. 10 is a flowchart illustrating a method of controlling the display apparatus 100 according to an example embodiment.

First, the display apparatus 100 determines a curvature indicating the degree of bending of the display panel including the left-eye pixels and the right-eye pixels (S1000). The display panel has a predetermined curvature or radius of curvature by bending the left/right of the display panel in the flat state. The curvature or radius of curvature is a value representing the degree of curve at each point of a curved surface. The curvature is a reciprocal number of the radius of curvature. As the radius of curvature increases, the curve of the curved surface becomes gentle, and as the radius of curvature decreases, the curve of the curved surface becomes tight. In other words, as the curvature increases, the curve of the curved surface becomes tight, and as the curvature decreases, the curve of the curved surface becomes gentle. That is, when the curvature is 0, a flat surface is obtained.

The curvature of the display panel is determined based on the distance between the display apparatus 100 and a viewer, the location of the viewer, and the viewing angle of the viewer. In addition, the display apparatus 100 may control the apparatus to bend the display panel based on the determined curvature. Accordingly, the display apparatus 100 determines the curvature of the display panel first.

The display apparatus 100 adjusts the distance between the display panel and the barrier area based on the determined curvature.

The display apparatus 100 may include the plurality of pixels and the visual field divider disposed in front of the plurality of pixels to provide a different point of view for each viewing area, that is, a multi-view.

When the visual field divider is implemented using the parallax barrier method, the visual field divider may be implemented using a transparent slit array including a plurality of barrier areas. The light is passed through slits between the barrier areas so that an image of a different point of view can be emitted for each viewing area. The visual field divider which is implemented by using the parallax barrier method is merely an example, and may be implemented by using a lenticular lens.

The display apparatus 100 may form the barrier areas by activating the area for blocking the light, which is included in the visual field divider. In particular, the visual field divider may include a plurality of blocking layers. The display apparatus 100 may selectively activate the plurality of blocking layers to have a distance between the plurality of pixels and the barrier areas changed based on the locations of the plurality of pixels and the curvature.

When the user views a 3D image through the display panel bent with a curvature, the user can view the 3D image of the enhanced effect by the above-described method without glasses.

The method of controlling the display apparatus according to the above-described various example embodiments may be coded by software and stored in a non-transitory readable medium. The non-transitory readable medium may be mounted and used in various devices.

The non-transitory readable medium refers to a medium that stores data semi-permanently rather than storing data for a very short time, such as a register, a cache, a memory or etc., and is readable by an apparatus. Specifically, the non-transitory readable medium may include a compact disc (CD), a digital versatile disk (DVD), a hard disk, a Blu-ray disk, a universal serial bus (USB), a memory card, a read only memory (ROM) or etc.

The foregoing example embodiments and advantages are merely examples and are not to be construed as limiting. The example embodiments can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A display apparatus comprising:
a display panel comprising a left-eye pixel and a right-eye pixel, the display panel having a curvature;
a visual field divider comprising a plurality of blocking layers at different distances from the display panel for blocking part of light output by the display panel, each of the plurality of blocking layers comprising a selectively activatable plurality of barrier areas; and
a processor configured to control the visual field divider to adjust a distance between the display panel and each of activated barrier areas of the plurality of blocking layers based on the curvature of the display panel,
wherein the processor is configured to control the visual field divider to reduce the distance between the display panel and each of the activated barrier areas of the plurality of blocking layers as a distance from a center of the display panel increases by selectively activating barrier areas of the plurality of blocking layers at different distances from the center of the display panel and to maintain a distance between the center of the display panel and barrier areas in the center of the display uniformly so that barrier areas of different blocking layers are activated at the center and a side end of the display panel, respectively, and barrier areas closer to the display panel are selectively activated as the distance from the center of the display panel increases toward the side end of the display panel.

2. The display apparatus of claim 1, wherein the processor is configured to adjust the distance between the display panel and the each of the activated barrier areas of the plurality of blocking layers to block a part of the light output by the display panel based on locations of the left-eye pixel and the right-eye pixel based on the curvature of the bent display panel.

3. The display apparatus of claim 2, wherein, the processor is configured to control a distance between left and right outermost ends of the display panel and each of the activated barrier areas of the plurality of blocking layers to be reduced, as the curvature of the display panel increases.

4. The display apparatus of claim 1, wherein the processor is configured to control the visual field divider to maintain the distance between the display panel and each of the activated barrier areas of the plurality of blocking layers uniformly in response to the curvature of the display panel being 0, and the processor is configured to control the visual field divider to reduce the distance between the display panel and each of the activated barrier areas of the plurality of blocking layers based on the curvature in response to the curvature of the display panel being greater than 0, as a distance from a center of the display panel increases.

5. The display apparatus of claim 1, further comprising a storage configured to store a barrier pattern indicating an activation state of each of the activated barrier areas of the plurality of blocking layers based on the curvature, and
wherein, in response to the curvature of the display panel being changed, the processor is configured to control activation of the plurality of barrier areas of the plurality of blocking layers based on the stored barrier pattern.

6. A method of controlling a display apparatus comprising a plurality of blocking layers at different distances from the display panel for blocking part of light output by the display panel, comprising:
determining a curvature indicating a degree of bending of the display panel, the display panel comprising a left-eye pixel and a right-eye pixel; and
adjusting a distance between the display panel and a plurality of barrier areas of the plurality of blocking layers based on the determined curvature,
wherein each of the plurality of blocking layers comprises selectively activatable plurality of barrier areas,
wherein said adjusting comprises controlling the distance between the display panel and activated barrier areas of the plurality of blocking layers to reduce the distance between the display panel and each of the activated barrier areas of the plurality of blocking layers as a distance from a center of the display panel increases by selectively activating the plurality of barrier areas of the plurality of blocking layers at different distances from the center of the display panel and to maintain a distance between the center of the display panel and barrier areas in the center of the display panel uniformly so that barrier areas of different blocking layers are activated at the center and a side end of the display panel, respectively, and barrier areas closer to the display panel are selectively activated as the distance from the center of the display panel increases toward the side end of the display panel.

7. The method of claim 6, wherein adjusting comprises adjusting the distance between the display panel and the each of the activated barrier areas of a plurality of blocking layers to block a part of light output by the display panel based on locations of the left-eye pixel and the right-eye pixel based on the curvature of the bent display panel.

8. The method of claim 7, wherein adjusting comprises, as the curvature increases, controlling a distance between left and right outermost ends of the display panel and each of the activated barrier areas of the plurality of blocking layers to be reduced.

9. The method of claim 6, wherein adjusting comprises, in response to the curvature of the display panel being 0, adjusting the distance between the display panel and each of the activated barrier areas of the plurality of blocking layers to be maintained uniformly, and, in response to the curvature being greater than 0, reducing the distance between the display panel and each of the activated barrier areas of the plurality of blocking layers based on the curvature as a distance from a center of the display panel increases.

10. The method of claim 6, further comprising storing a barrier pattern indicating an activation state of each of the activated barrier areas of the plurality of blocking layers based on the curvature, and
wherein the adjusting comprises, in response to the curvature of the display panel being changed, controlling activation of the plurality of barrier areas of the plurality of blocking layers based on the stored barrier pattern.

\* \* \* \* \*